United States Patent [19]

Rau et al.

[11] Patent Number: 5,108,728

[45] Date of Patent: Apr. 28, 1992

[54] PROCESS FOR THE PRODUCTION OF GRANULATED DICALCIUM PHOSPHATE DIHYDRATE

[75] Inventors: Karl-Martin Rau, Ettlingen; Karl Merkenich, Fürth/Fahrenbach; Erwin Stoffel, Laudenbach, all of Fed. Rep. of Germany

[73] Assignee: BK Ladenburg GmbH, Ladenburg, Fed. Rep. of Germany

[21] Appl. No.: 662,967

[22] Filed: Mar. 1, 1991

[30] Foreign Application Priority Data

Mar. 3, 1990 [DE] Fed. Rep. of Germany ....... 4006734

[51] Int. Cl.$^5$ .............................. C01B 25/32
[52] U.S. Cl. .................................... 423/309
[58] Field of Search ........................... 423/309

[56] References Cited

U.S. PATENT DOCUMENTS

| 3,294,486 | 12/1966 | Cremer et al. | 423/309 |
| 3,304,249 | 2/1967 | Katz | 423/DIG. 16 |
| 3,467,495 | 12/1965 | Nielsson | 23/108 |
| 3,467,497 | 9/1969 | Nielsson | 423/309 |
| 3,620,753 | 11/1971 | Cremer et al. | 99/21 |
| 4,166,839 | 9/1991 | Skauli et al. | 423/311 |
| 4,675,188 | 6/1987 | Chu | 424/154 |

FOREIGN PATENT DOCUMENTS

| 054333 | 6/1982 | European Pat. Off. . |
| 1817127 | 7/1970 | Fed. Rep. of Germany . |
| 2512099 | 9/1973 | Fed. Rep. of Germany . |
| 100875 | 11/1962 | Norway . |

*Primary Examiner*—Wayne Langel
*Attorney, Agent, or Firm*—Foley & Lardner

[57] ABSTRACT

A process is disclosed for the production of granulated dicalcium phosphate dihydrate from fine-grained, powered dicalcium phosphate dihydrate, wherein 80 t0 95% of dicalcium phosphate dihydrate with a grain size of less than 120 μm and 20 to 5% of calcium hydroxide with a grain size of less than 120 μm are dry mixed and continuously sprayed and granulated in a fluidized bed with 20 to 50% of water, relative to the amount of solids, in which is contained an amount of phosphoric acid sufficient for the neutralization of the calcium hydroxide. The granulate obtained is dried at a temperature of 150° to 200° C., and the portions of coarse and fine grained material are optionally sieved off.

12 Claims, No Drawings

PROCESS FOR THE PRODUCTION OF GRANULATED DICALCIUM PHOSPHATE DIHYDRATE

BACKGROUND OF THE INVENTION

The present invention relates to a process for the production of granulated dicalcium phosphate dihydrate from fine-grain, powdered dicalcium phosphate dihydrate.

Dicalcium phosphate is used technically on a large scale as an additive for toothpastes and as a carrier material in pharmaceutical tablets. For both purposes, grains or granulates with a grain size of about 100 to 500 $\mu$m are required, since they are handled without difficulty in mixing and filling apparatus, i.e., they are free-flowing and do not cause much dust. However, in the case of production by the reaction of calcium carbonate in aqueous suspension with aqueous phosphoric acid, a relatively fine-grained product results, the grain size of which lies predominantly in the range of from 1 to 50 $\mu$m.

Published German Patent Application DE-2,512,099, discloses a process in which highly-concentrated suspensions of calcium carbonate and phosphoric acid are mixed in a tubular reactor at a temperature of about 90° C. The resultant carbon dioxide divides the mixture into fine droplets which drop through the reactor to give dicalcium phosphate and solidify sufficiently so that the granulates formed can be collected and dried. Because of the production with the formation of large amounts of carbon dioxide, such granulates have a low bulk density and strength so that they are of only limited suitability for further working up.

Norwegian Patent Specification No. 100,875 discloses the reaction of calcium carbonate with phosphoric acid in a kneader apparatus. The products are agglomerated in a moist state, but break down into a flowable powder in the case of further working up and drying. Therefore, in German Patent Specification No. DE-2,512,099, mention of further compaction by means of granulation apparatus proves to be speculative.

German Patent Specification No. DE-1,817,127 discloses granulation fine-grained phosphates by the addition of aqueous sodium hydroxide solution and acidic calcium dihydrogen phosphates. The sodium phosphate resulting from the reaction appears to act as a binding agent which holds together the grains of calcium phosphate. Such products are admittedly suitable as "mineral animal feedstuffs," but not for the pharmaceutical industry, in which the proportion of sodium phosphate would have a detrimental effect.

In addition, published European Patent Application No. 54,333, describes a process for the production of granulated calcium phosphates, also including dicalcium phosphate dihydrate, by pressing fine particles with a size of from 1 to 75 $\mu$m under high pressure to give thin plates which can subsequently be broken up or ground to give a granulate of appropriate size. The dried, pressed material is not very firm, contains a high proportion of dust and, because of the breaking up or grinding, has a very angular form which is not very suitable for further working up.

In U.S. Pat. No. 3,467,495, a process is disclosed for producing granulated calcium phosphates, also including dicalcium phosphate, by carrying out the reaction of phosphoric acid with calcium carbonate or calcium hydroxide in a kneader, using a 2.5 to 10 fold amount of a finely-divided calcium phosphate as crystallization nuclei and reaction bed. Granulates of the necessary size are apparently only obtained in low yield, since a large portion must be recycled to the process as fine-grained material or as oversized grains to be ground again. Consequently, only a small proportion of usable granulate results.

SUMMARY OF THE INVENTION

It is therefore an object of the present invention to convert such fine-grained dicalcium phosphates into a granular form which can be used without granulation adjuvants which have a detrimental effect in the case of further working up.

In accordance with these and other objects of the invention, process is provided for the production of granulated dicalcium phosphate dihydrate from fine-grained, powdered dicalcium phosphate dihydrate, comprising the steps of dry mixing about 80 to 95% of dicalcium phosphate dihydrate with a grain size of less than about 120 $\mu$m and 20 to 5% of calcium hydroxide with a grain size of less than about 120 $\mu$m; continuously spraying and granulating the mixture in a fluidised bed with about 20 to 50% of water, relative to the amount of solids, the water containing an amount of phosphoric acid sufficient for the neutralization of the calcium hydroxide; and, drying the granulate obtained at a temperature of about 150° to 200° C. The present invention provides granulated dicalcium phosphate dihydrate, produced by this process.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

According to the present invention, granulated dicalcium phosphate dihydrate is produced from fine-grained, powdered dicalcium phosphate dihydrate. About 80 to 95% of dicalcium phosphate dihydrate with a grain size of less than about 120 $\mu$m and about 20 to 5% of calcium hydroxide with a grain size of less than about 120 $\mu$m are dry mixed and continuously sprayed and granulated in a fluidised bed with about 20 to 50% of water, relative to the amount of solid material. An amount of phosphoric acid sufficient for the neutralization of the calcium hydroxide is also contained in the mixture. The granulate obtained is dried at a temperature of from about 150° to 200° C. and the portions of coarse and fine grain material are optionally sieved off.

Surprisingly, under the conditions according to the present invention, there is obtained, in high yield and completely without detrimental binding agent components, a granulate which is outstandingly useful for further working up. The so-produced granulate has a relatively high bulk density and strength. The individual granulate grains are substantially spherical and, therefore, are readily packable and flowable in transport and working-up apparatus. More than 90% of the granulate produced by the process according to the present invention preferably has a grain size of more than about 120 μm.

According to the process of the present invention, the fine grain obtained in the case of the production of coarse crystalline dicalcium phosphate, which was previously regarded as being a waste product, is mixed with about 5 to 20% by weight of powdered calcium hydroxide which can possibly contain up to about 50% by weight of calcium carbonate and is fluidised in a fluidised bed. Aqueous phosphoric acid is then sprayed into this fluidised bed in an amount of from 20 to 50% by weight based on a solution having a content of phosphoric acid of 30 to 60% by weight. The powder particles come together to form agglomerates, and the phosphoric acid and calcium hydroxide react to form calcium phosphate and consolidate the agglomerates. Excess water is subsequently removed at an elevated temperature, for example, at 150° to 200° C., and, insofar as is necessary, small proportions of fine and oversize grain are removed with a sieve.

In the case of the use of starting materials at ambient temperature, due to the heat of reaction, a reaction temperature of about 30° to 80° C. is obtained, preferably a temperature of about 40° to 75° C. Higher temperatures appear to be less favorable since the water droplets necessary for the primary coming together of the fine grains then evaporate too quickly, whereas too low temperatures may be unfavorable since the granulate grains harden too slowly.

Calcium hydroxide is preferably used as the calcium compound. However, to a certain extent, calcium hydroxide can be replaced by calcium oxide or calcium carbonate. When calcium carbonate is used, the carbon dioxide resulting from the reaction with phosphoric acid negatively influences the holding together of the granulate and, therefore, it should not exceed a certain percentage. However, the proportion of calcium carbonate contained in commercially-available calcium hydroxide, which can amount to up to about 50% by weight, does not disturb the reaction.

The powders of dicalcium phosphate and calcium hydroxide used have a grain size of less than about 120 μm, powders with an average grain size of about 5 to 50 μm preferably being used, such as are obtained directly in the case of production. Recycled fine grain from the production, which can have grain sizes of up to about 120 μm, is either used directly or is partly ground in order to be able to use a homogeneous starting material.

The process according to the present invention can be carried out particularly well with a mixing apparatus such as the "Flexomix" apparatus made by the firm Schugi. This mixer comprises a vertical cylinder with a rapidly rotating shaft (1000 to 3000 r.p.m.), on which are mounted variable mixing tools (knives), the angles of incidence of which are adjustable.

Powder and liquids are metered in on the upper side of the cylinder. The components are fluidised and mixed due to the high air turbulence. The residence time of the products in the mixer/agglomerator is about one second. The mixing chamber is only about 10% filled with product, i.e., in the case of a throughput of, for example, 1 ton/hour, only about 300 g of product are present in the mixing chamber.

A self-cleaning device is provided where product adhesions could occur. For this purpose, a movable roller cage is arranged around a flexible cylinder wall. By means of continuous movement of the roller cage, the wall is deformed and adhesions are thereby removed.

The following Examples are given for the purpose of illustrating the process of the present invention:

GENERAL PROCESS

Dicalcium phosphate dihydrate with a bulk density of 615 g/liter and with an average grain size of less than 120 μm and preferably of 5 to 50 μm is mixed with a technical calcium hydroxide powder of appropriate grain size which contains about 50% by weight of calcium carbonate. The mixture is continuously introduced into a Schugi "Flexomix" or into an appropriate fluidised bed apparatus. Aqueous phosphoric acid is sprayed in the given amounts.

EXAMPLE 1 knife adjustment: +2
material: 50 kg dicalcium phosphate dihydrate +5 kg calcium hydroxide, dry mixture
added liquid: 54% phosphoric acid
introduced amount of solids: 480 kg/hour
introduced amount of liquid: 3.3 kg/minute
bulk density: 700 g/liter

| grain distribution: | |
|---|---|
| mm | grain % |
| 1.4 | 2.4 |
| 1.0 | 8.5 |
| 0.71 | 20.8 |
| 0.50 | 37.8 |
| 0.25 | 79.0 |
| 0.125 | 96.4 | pH value of a 20% slurry: 3
mole ratio of $H_3PO_4:Ca(OH)_2 = 1.87:1$

The result was a good granulate.

In this example, and also in Examples 2, 3 and 4, the material temperature at the outlet of the Flexomix was 50° C. and heated up further to 68° C. (heat of neutralization).

EXAMPLE 2 knife adjustment: +2
materials: 50 kg dicalcium phosphate +10 kg calcium hydroxide, dry mixture
added liquid: 54% phosphoric acid
introduced amount of solids: 480 kg/hour
introduced amount of liquid: 3.3 kg/minute
bulk density: 680 g/liter

| grain distribution: | |
|---|---|
| mm | grain % |
| 1.4 | 4.0 |
| 1.0 | 12.3 |
| 0.71 | 24.8 |
| 0.50 | 38.2 |
| 0.25 | 77.9 |
| 1.125 | 93.3 | pH value of a 20% slurry: 4
mole ratio of $H_3PO_4:Ca(OH)_2 = 1.02:1$

The result was a good granulate.

EXAMPLE 3 knife adjustment: +2 materials: 50 kg dicalcium phosphate + 15 kg calcium hydroxide, dry mixture
added liquid: 54% phosphoric acid
introduced amount of solids: 480 kg/hour
introduced amount of liquid: 3.3 kg/minute
bulk density: 665 g/liter

| grain distribution: | |
|---|---|
| mm | grain % |
| 1.4 | 3.3 |
| 1.0 | 11.5 |
| 0.71 | 20.9 |
| 0.50 | 33.8 |
| 0.25 | 64.3 |
| 0.125 | 81.7 | pH value of a 20% slurry: 6.5
mole ratio of $H_3PO_4:Ca(OH)_2 = 0.74:1$

The result was a comparatively fine granulate, and the dust component was relatively high.

EXAMPLE 4 knife adjustment: +2
materials: 50 kg dicalcium phosphate + 15 kg calcium hydroxide, dry mixture
added liquid: 54% phosphoric acid + water
introduced amount of solids: 480 kg/hour
introduced amount of liquid: 3.32 kg/minute 54% phosphoric acid + 1.4 kg/minute water
bulk density: 681 g/liter

| grain distribution: | |
|---|---|
| mm | grain % |
| 1.4 | 0.8 |
| 1.0 | 0.9 |
| 0.71 | 4.4 |
| 0.50 | 8.9 |
| 0.25 | 40.4 |
| 0.125 | 76.1 | pH value of a 20% slurry: 7
mole ratio of $H_3PO_4:Ca(OH)_2 = 0.74:1$

The result was a very high proportion of dust, and poor granulate.

EXAMPLE 5 (COMPARATIVE)

knife adjustment: +2
material: 50 kg dicalcium phosphate
added liquid: water
introduced amount of solids: 480 kg/hour
introduced amount of liquid: 3.3 kg/minute
bulk density: 635 g/liter The result was no granulation, and a grain distribution similar to that of the starting material.

What is claimed is:

1. A process for the production of granulated dicalcium phosphate dihydrate from fine-grained, powdered dicalcium phosphate dihydrate, comprising the steps of:
    dry mixing about 80 to 95% of dicalcium phosphate dihydrate with a grain size of less than about 120 $\mu$m and 20 to 5% of calcium hydroxide with a grain size of less than about 120 $\mu$m;
    continuously spraying and granulating the mixture in a fluidised bed with about 20 to 50% of water, relative to the amount of solids, the water containing an amount of phosphoric acid sufficient for the neutralization of the calcium hydroxide; and
    drying the granulate obtained at a temperature of about 150° to 200° C.

2. A process according to claim 1, wherein the granulation is carried out at a temperature of from about 40° to 75° C.

3. A process according to claim 1, wherein up to 50% of the calcium hydroxide is replaced by calcium carbonate.

4. A process according to claim 1, wherein the grain size of the starting materials is about 5 to 50 $\mu$m.

5. A process according to claim 1, wherein more than about 90% of the granulate has a grain size of more than about 120 $\mu$m.

6. A process according to claim 1, additionally comprising the step of sieving off course and fine-grained material.

7. A process according to claim 1, wherein said water comprises 30 to 60% by weight of said phosphoric acid.

8. A process according to claim 1, wherein the granulation is carried out at a temperature of from about 30° to 80° C.

9. A process according to claim 1, wherein the calcium hydroxide includes calcium oxide or calcium carbonate.

10. A process according to claim 1, wherein binding agents are not added during said process.

11. A process according to claim 1, wherein the mole ratio of phosphoric acid to calcium hydroxide is between 0.74:1 to 1.87:1.

12. A process according to claim 1, which consists essentially of the stated steps.

* * * * *